Figure 1:
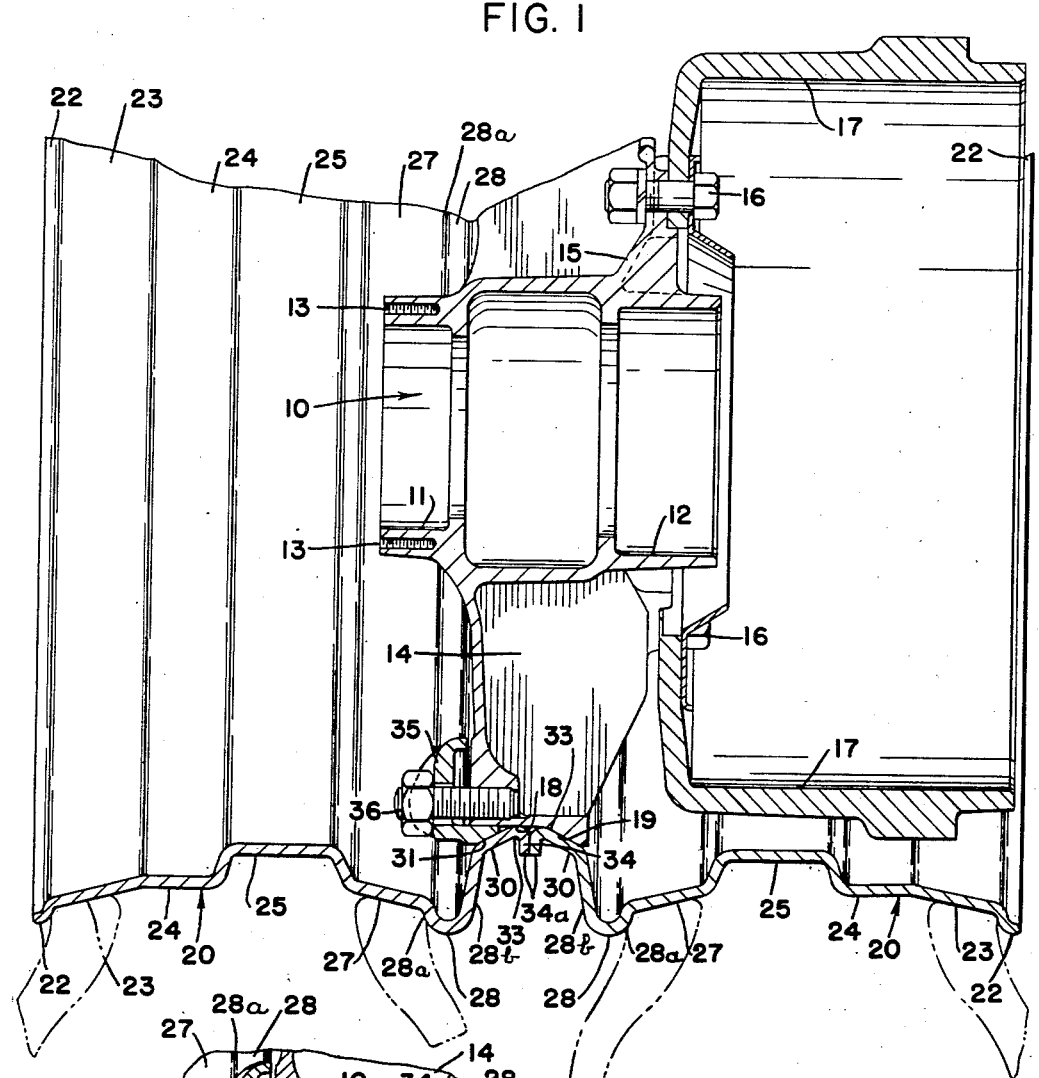

March 22, 1960     D. A. WALTHER     2,929,659

DROP CENTER RIM

Filed May 29, 1956

INVENTOR
DANIEL A. WALTHER

BY *Ely, Frye & Hamilton*

ATTORNEYS

United States Patent Office 2,929,659
Patented Mar. 22, 1960

2,929,659
DROP CENTER RIM

Daniel A. Walther, Dayton, Ohio, assignor to The Dayton Steel Foundry Company, Dayton, Ohio, a corporation of Ohio Application May 29, 1956, Serial No. 588,061

4 Claims. (Cl. 301—13)

The present invention relates to an automotive tire rim construction. More particularly, the invention relates to an improved "drop center" rim construction especially suited for the accurate and rapid mounting in dual arrangement of heavy duty tubeless truck or trailer tires.

It is a general object of the invention to provide an improved drop center rim construction. Further, it is an object to provide a rim construction especially suited for the accurate and rapid mounting of tubeless tires on a vehicle wheel. Still further, it is an object to provide a tire rim having a strengthening rib and a preformed and integral mounting and spacer flange which eliminates the need for an independent spacer or separator and thus enables the rim to be accurately mounted, and utilized with equal facility, as either an inner or outer rim.

Further objects of the invention will be apparent in view of the following detailed description thereof taken in conjunction with the attached drawing.

Figure 2:
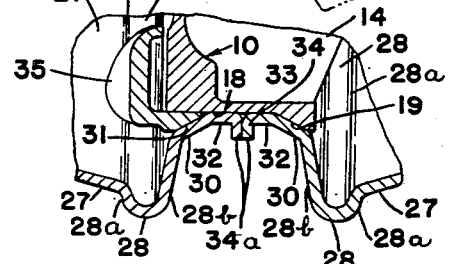

In the drawing:

Fig. 1 is a fragmentary vertical cross-section of a dual mounting of the improved rim on a vehicle wheel; and Fig. 2 is a fragmentary view of a modified form of the rim especially adapted for the dual mounting of tires having a large cross-section.

The vehicle wheel shown in the drawing is of standard design and construction and is provided with a hub indicated generally by the numeral 10. The hub is provided with finished seats 11 and 12 for anti-friction bearings. When the axle and bearings are in position, the outer end of the hub may be closed with a cover plate (not shown) bolted in the tapped holes 13. Extending radially of the hub in circumferentially spaced apart relationship are a plurality of spoke members 14. Each spoke member is dished inwardly toward the inner side of the wheel and between adjacent spokes are annular rib sections or webs 15, through which are inserted a plurality of bolts and nuts 16 for fastening the wheel to the brake drum 17.

Each of the spoke members 14 is connected at its radially outer end with an axially extending circumferential outer bearing surface 18 which provides the felly or rim segment of the wheel. The axially inner portion of the felly 18 terminates in a standard 28° bevelled bearing surface 19, which provides a seat for the mounting flange of an improved rim, indicated generally by the numeral 20.

As shown in the drawing, two rims 20 are mounted in dual fashion around the wheel felly 18. Though reversed and mounted in opposition to one another, both rims are identical in construction and therefore only the outer rim need be described in detail, each element of the rim being annular unless otherwise noted.

The rim 20 includes a low or side flange 22 serving to confine the edge of the outer facing tire bead (shown in broken lines). Inwardly of the low flange is the adjoining outer facing bead flange 23, having a standard 15-20° taper, and a substantially horizontal safety ledge 24. The safety ledge terminates in the drop center well 25 which is directed radially inwardly away from the outer circumference of the rim. These components of the rim 20, elements 22—25, are constructed in accordance with established principles of rim design.

Inwardly of the center well 25 is an inner facing bead flange 27 having a taper similar to that of flange 23. The bead flange 27 terminates in a radially outwardly directed rib 28 of such depth and having sufficient rigidity so as to materially strengthen the entire rim 20. The inner face 28a of the rib functions, with respect to the inner bead of the tire, in the same manner as the low flange 22 functions with respect to the outer tire bead.

The outer face 28b of the rib 28 is directed radially inwardly away from the outer circumference of the rim and terminates in an angular mounting portion or surface 30 inclined radially and inwardly from the center well at the desired taper, preferably 28°. The surface 30 is engaged either by a beveled bearing surface 31 on the mounting clamps, described below, or upon the bearing surface 19 of the wheel.

The mounting surface 30 terminates in an acutely angled bead portion 33 having the smallest diameter of the several annular rim elements. The diameter of the bead 33 is so chosen that it is substantially the same as the diameter of the felly surface 18. In actual practice a clearance in the range of .016–020 inch is satisfactory.

Extending radially outward from the bead portion 33, in a plane at substantially right angles to the axis of rotation of the vehicle wheel, is a spacer flange 34. The outer facing surface 34a is the guide or positioning surface which enables two rims 20 to be accurately mounted, in opposed relation, on a vehicle wheel.

Referring to Fig. 2, the improved rim 20 may be modified to handle tires having an unusually large cross-section by the inclusion of a surface 32, between the mounting surface 30 and the bead 33. The mounting surface 32 is substantially parallel with the felly surface 18 and preferably has the same diameter as the bead 33. The length of the surface 32 is so chosen as to provide the desired clearance between the side walls of tires having a large cross-section.

The rims 20 are mounted on the vehicle wheel in the manner shown. That is, the inner rim, with tire mounted thereon, is slipped over the outer end of the wheel and seated with the mounting surface 30 in continuous radial contact with the bearing surface 19. The outer rim is then fitted over the wheel and moved inwardly until the spacer flange 34 of the outer rim is in abutting contact with the spacer flange on the inner rim. A plurality of rim fastening lugs 35 each having the bevelled bearing surface 31 are then tightened by suitable bolts 36 so that the surfaces 31 of the clamp engage the mounting surface 30 of the outer rim and secure both rims to the wheel.

It is apparent from the above description that the invention relates to a novel rim construction that eliminates the need for a spacer or separator between rims mounted in dual fashion. It is further apparent that the provision of an integral spacer flange which may be accurately formed to close tolerances during fabrication of the rim enables the improved rims to be accurately and rapidly mounted in dual fashion.

What is claimed is:

1. In a drop center rim having bead flanges extending laterally of the center well and a low side flange extending laterally of one of said bead flanges, the improvement consisting of a rib connected to the other of said bead flanges and mounting and spacer flanges extending laterally of said rib, said rib having a shallow outwardly directed portion, forming a low side flange, and an elongated inwardly directed portion, said mounting flange having an inclined mounting portion extending axially inward of and away from said center well and being connected to the innermost end of said elongated portion, said spacer flange being connected to the innermost end of said mounting flange and extending radially outwardly in a plane at substantially right angles to the axis of rotation of the rim.

2. In a drop center rim having bead flanges extending laterally of the center well and a low side flange extending laterally of one of said bead flanges, the improvement consisting of a rib connected to the other of said bead flanges and mounting and spacer flanges extending laterally of said rib, said rib having a shallow outwardly directed portion forming a low side flange, and an elongated inwardly directed portion, said mounting flange having an inclined tapered mounting portion extending axially inward of and away from said center well and being connected to the innermost end of said elongated portion and further having a portion extending laterally of said mounting portion away from said center well, said spacer flange being connected to the outer end of said lateral portion and extending radially outwardly in a plane at substantially right angles to the axis of rotation of the rim.

3. In a drop center rim having bead flanges extending laterally of the center well, the improvement consisting of a radially inwardly directed mounting flange terminating in a spacer flange, said mounting flange being integral with one of said bead flanges at the axially outward position thereof and having an inclined mounting portion radially inward of said center well, said spacer flange extending radially outwardly in a plane at substantially right angles to the axis of rotation of the rim.

4. In a drop center rim having bead flanges extending laterally of the center well, the improvement consisting of a radially inwardly directed mounting flange terminating in a spacer flange, said mounting flange being integrally connected to one of said bead flanges by a radially outwardly directed rib portion and having an inclined bearing surface extending axially inward of and away from said center well, said spacer flange extending radially outwardly from the inner end of said bearing surface in a plane at substantially right angles to the axis of rotation of the rim.

References Cited in the file of this patent

UNITED STATES PATENTS

| 2,194,206 | MacDonald | Mar. 19, 1940 |
| 2,779,631 | Powers | Jan. 29, 1957 |

FOREIGN PATENTS

| 15,144 | Great Britain | Oct. 19, 1911 |

UNITED STATES PATENT OFFICE
CERTIFICATE OF CORRECTION

Patent No. 2,929,659            March 22, 1960

Daniel A. Walther

It is hereby certified that error appears in the printed specification of the above numbered patent requiring correction and that the said Letters Patent should read as corrected below.

Column 2, line 26, for ".016-020" read -- .016-.020 --; column 4, line 3, for "position" read -- portion --.

Signed and sealed this 30th day of August 1960.

(SEAL)

Attest:

ERNEST W. SWIDER
Attesting Officer

ROBERT C. WATSON
Commissioner of Patents